No. 820,034. PATENTED MAY 8, 1906.
F. F. ANDERSON.
TIME EGG BOILER.
APPLICATION FILED FEB. 15, 1905.
2 SHEETS—SHEET 1.
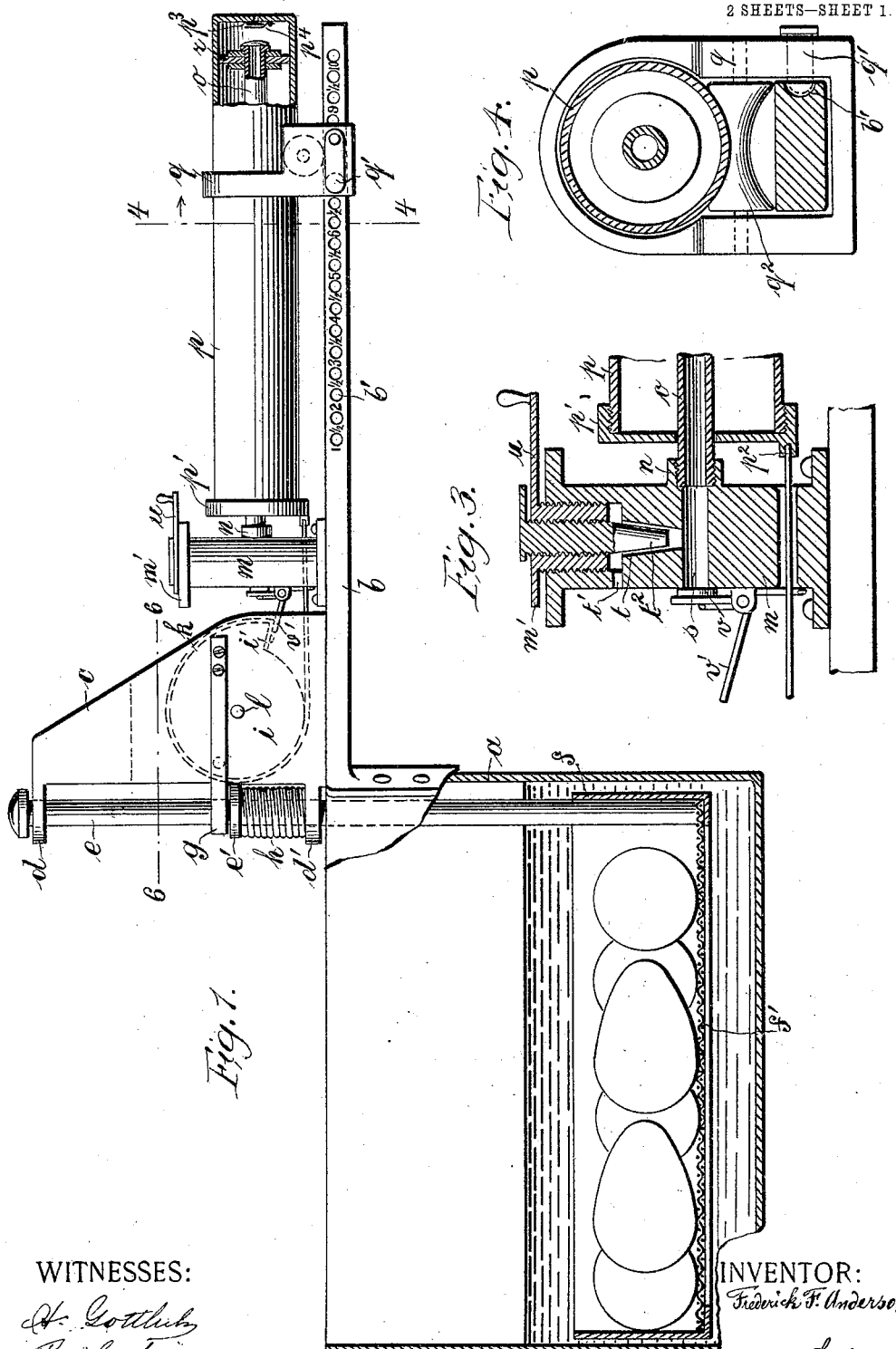
WITNESSES:
INVENTOR:
Frederick F. Anderson,
By his Attorney No. 820,034. PATENTED MAY 8, 1906.
F. F. ANDERSON.
TIME EGG BOILER.
APPLICATION FILED FEB. 15, 1905.
2 SHEETS—SHEET 2.
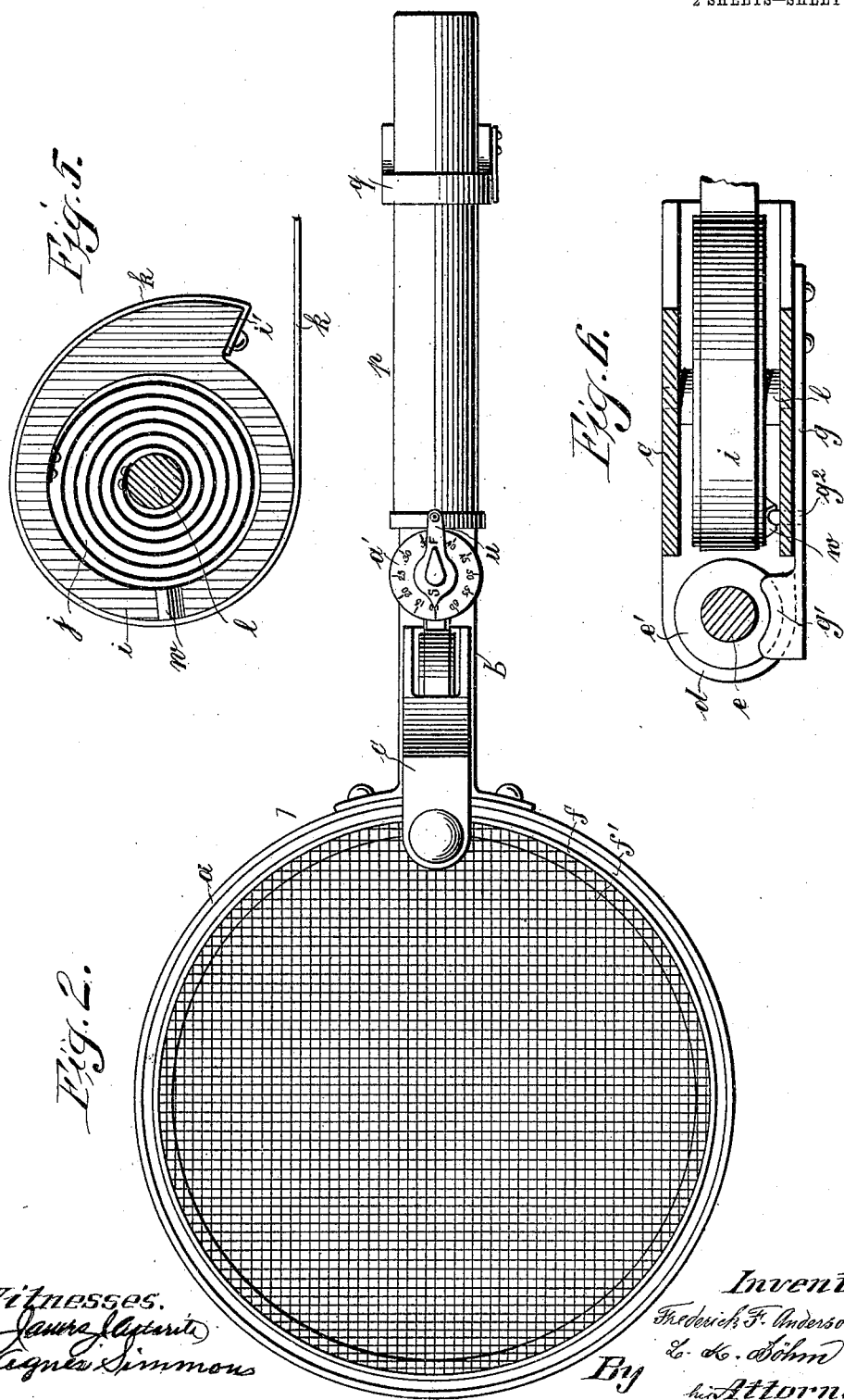
Witnesses.
Inventor
Frederick F. Anderson

UNITED STATES PATENT OFFICE.

FREDERICK F. ANDERSON, OF NEW YORK, N. Y.

TIME EGG-BOILER.

No. 820,034.  Specification of Letters Patent.  Patented May 8, 1906.

Application filed February 15, 1905. Serial No. 245,674.

*To all whom it may concern:*

Be it known that I, FREDERICK F. ANDERSON, a citizen of the United States of America, and a resident of New York, in the county and State of New York, have invented certain new and useful Improvements in Automatic Egg-Boilers, of which the following is a specification.

This invention has reference to improvements in an automatic egg-boiler which is so constructed that the period of time for which the eggs are to be boiled is previously set, and after this period of time has elapsed the eggs are automatically lifted out of the boiling water.

It is well known that the longer eggs are boiled the harder they become. Some persons prefer soft-boiled eggs, while others want them hard. Therefore it is desirable to have an apparatus by means of which eggs may be boiled for any desired number of minutes without requiring personal attention. My novel and automatic egg-boiler fulfils the desired requirements. When the water is boiling, then the eggs are placed into the egg-container of the apparatus and let down into the boiling water. The attendant now may perform other duties without fear, because the eggs will automatically be lifted out of the boiling water when the time set on the apparatus has elapsed.

The invention is illustrated in the accompanying drawings, in which—

Figure 1 represents in side elevation, partly in section, an automatic egg-boiler which embodies my invention. Fig. 2 illustrates same in top plan view. Fig. 3 is a detail view of an air-valve shown in vertical section. Fig. 4 is a cross-section on lines 4 4 of Fig. 1. Fig. 5 is a detail view of a cam with spring inclosed; and Fig. 6 is a top plan view, partly in section, on line 6 6 of Fig. 1.

Similar characters of reference denote like parts in all the figures.

The automatic egg-boiler is furnished complete with all parts permanently secured thereto.

In the drawings, $a$ represents a cooking vessel made, preferably, of enameled-iron ware, and $b$ is a handle attached to the vessel $a$ in the usual manner. On the front top portion of the handle $b$ there is mounted a frame $c$, forming a ring $d$ at its top end and a ring $d'$ at its bottom end, both being integral therewith. A rod $e$ passes through both rings down into the cooking vessel. An egg-container $f$ is stationarily fixed to the lower end of this rod. The egg-container is circular in shape like the cooking vessel and has a wire-gauze bottom $f'$. The length of the rod $e$ is so selected that the egg-container $f$ does not reach the bottom of the cooking vessel $a$, as is shown in Fig. 1. Thus the eggs never rest on the bottom of the cooking vessel. They are practically suspended in the boiling water, which produces more delicious eggs. A spring-lever $g$ is riveted to the frame $c$, as shown in Figs. 1 and 6. The front portion $g'$ of the spring-lever is somewhat enlarged and forms a curve on its inner end, as shown in Fig. 6. Below the spring-lever and on the rod $e$ there is a permanently-fixed collar $e'$. Between this fixed collar and the ring $d'$ a spring $h$ is provided on this rod. The spring $h$ is held in the position indicated in Fig. 1 by the spring-lever $g$ during the process of boiling the eggs. The lever is automatically released when the eggs have been boiled for the desired period of time. Then the spring will expand and pull up the egg-container out of the boiling water, as will be fully described farther down.

A cam $i$ is mounted within the frame $c$, which contains a spring $j$, as shown in detail in Figs. 1 and 5. A short cable $k$ is secured to the cam, which turns on a shaft $l$. Next to the frame $c$ there is on the handle of the cooking vessel a stand $m$, through the lower portion of which passes the cable $k$, as shown in Figs. 1 and 3. A short piece or neck $n$ is cast on the stand $m$ in about its rear middle portion. This neck is provided inside with a screw-thread into which fits an iron tube $o$, which is threaded on the outside. The tube $o$ runs centrally through a cylinder $p$, which has a cap $p'$ on its front end. The lower portion of this cap has a short forward portion $p^2$, wherein the one end of the cable $k$ is permanently secured. The cylinder $p$ is closed at the rear end and has a small opening $p^3$. On the inside and resting against the opening there is a valve $p^4$, which is of usual construction. The cylinder $p$ is supported on a frame $q$ and rests on a roller-bearing $q^2$ to ease the drawing out and the return of same. (See Figs. 1 and 4.) The narrow tube $o$, located within the cylinder $p$, is provided at the rear end with a piston $r$, the tube acting thus as a piston-rod. However, the piston-rod or tube $o$ is stationarily mounted, while the cylinder $p$ may be moved thereon, whereby the cam $i$ is operated. The cable $k$ then is pulled along with the cylinder $p$, because it is permanently attached thereto with one end, as shown in Figs. 1 and 5. The cable $k$ is relatively long, the other end of same being secured to the shoulder $i'$ of the cam $i$. When the cylinder $p$ is pulled out, then the air between the piston and cap $p'$ escapes between the central opening in the cap and the hollow piston-rod, which latter is not fixed air-tight in said opening, allowing at the same time the cylinder to be easily moved in and out. By pulling out the cylinder the valve $p^4$ is actuated by the pressure of the atmosphere, and air rushes into the cylinder through the opening $p^3$. Upon releasing the cylinder the spring $j$ within the cam $i$ gradually draws back the cylinder $p$, whereby the valve $p^4$ is closed and the air contained in the rear portion of the cylinder somewhat compressed. The compressed air in the cylinder passes through the inner tube $o$, which is open at both ends, and enters into the channel $s$ within the stand $m$. (See Fig. 3.) From here the air passes through the conical and adjustable air-escaping valve $t$ and sidewise out into the atmosphere through the short channel $t'$. The conical portion $t^2$ of the valve is located in a conical channel and connected at the top with a lever $u$, which permits of screwing up and down the conical plunger $t^2$, whereby the space for the escaping air may be increased and decreased. It is plainly seen that the compressed air of the rear portion of the cylinder $p$ will quickly escape when the space between the conical arrangement and the conical channel is increased, and the air will slowly escape when this space is decreased. Hereby I attain an adjustment of the time required for the complete return of the cylinder to its original position. (Indicated in Fig. 1.) The top of the stand or support $m$ has secured thereto a circular plate $m'$, which is graduated, showing numbers thereon and the letters "S" "F," indicating slow and fast. This scale may be empirically graduated and serves for setting the apparatus for longer periods of time, whereby the apparatus is rendered capable of being used for boiling vegetables, fruit, and the like. On the front of the stand $m$ there is provided a spring-valve $v$, which closes the channel $s$ under normal conditions. However, when the spring $j$ has completely drawn back the cylinder $p$ and the cam returned into the position shown in Fig. 1 then the cam actuates the lever $v'$ of the spring-valve $v$, whereby said valve is opened and the rest of the air contained in the cylinder $p$ allowed to escape.

The cam $i$ is provided with a wedge $w$. (Shown in Figs. 5 and 6.) When the apparatus is in the position indicated in Fig. 1, then the wedge $w$ bears against the pin $q^2$ of the spring-lever $g$ with its sharp end. The curved front portion $g'$ of this lever is then in the position indicated in detail in Fig. 6 and keeps down the fixed ring $e'$ and the spring $h$ on the rod $e$. Upon the return of the cam $i$ to its normal position the wedge $w$ is moved along and gradually forces the spring-lever and its curved front portion away from the ring $e'$, and at a certain moment the lever is completely released, and thereby the spring $h$ in turn lifts the egg-container out of the boiling water.

For boiling eggs a scale is provided on the rear portion of the handle $b$. The handle is provided with indentations $b'$, as shown in Figs. 1 and 4. These indentations represent each one-half minute. On the frame $q$ there is a pin $q'$, which fits into the indentations $b'$, the and the whole frame may be shifted along handle. If it is desired to boil eggs for three or four minutes, then the frame is shifted to the respective number and the cylinder $b$ drawn out. Assuming now that this frame $q$ is shifted onto one of the numbers—say, for instance, "3"—and the cylinder drawn out, then it cannot be drawn out any farther than the frame $q$ permits, which on number "3" is a short distance. The cap $p'$ rests, then, against the frame $q$, whereby a further drawing out of the cylinder is prevented. When the frame $q$ stands at number "3," then the distance for which the cylinder may be pulled out is rather short, and consequently the quantity of air allowed to rush into the cylinder through the opening $p^3$ is relatively small and will pass the air-escape valve in a relatively short time. When the frame $q$ is set, say, on the number "4," then the cylinder may be drawn out somewhat farther, more air will rush into the cylinder through the opening $p^3$, and the time necessary for the air to escape through the escape-valve $t$ is lengthened, in this instance, to four minutes.

The apparatus works very accurately, because the retarding medium which opposes the action of the spring $j$ in the cam is slightly-compressed air, which is very elastic and exerts the little pressure very uniformly.

Having thus described my invention, I claim as new and desire to secure by Letters Patent—

1. An automatic egg-boiler comprising a cooking vessel with handle, a frame attached to the front end of said handle, a rod movably attached in said frame and extending down nearly to the bottom of the cooking vessel, an egg-container permanently fixed to the bottom portion of said rod and a spring with a fixed ring on its upper portion, a horizontal lever on the frame holding down the spring, a cam mounted within the frame, a spring in said cam and a wedge thereon so arranged that upon turning the cam the wedge will release the spring-lever, and means for operating said cam.

2. An automatic egg-boiler comprising a cooking vessel with handle, a frame attached to the front end of said handle, a rod movably attached in said frame and extending down nearly to the bottom of the cooking vessel, an egg-container permanently fixed to the bottom portion of said rod and a spring with a fixed ring provided on its upper portion, a horizontal lever on the frame holding down the spring, a cam mounted within the frame, a spring in said cam and a wedge thereon so arranged that upon turning the cam the wedge will release the spring-lever, a cable surrounding said cam secured with one end to its shoulder and means for actuating the cable and cam.

3. An automatic egg-boiler comprising a cooking vessel with handle, a frame attached to the front end of said handle, a rod movably attached in said frame and extending down nearly to the bottom of the cooking vessel, an egg-container permanently fixed to the bottom portion of said rod and a spring with a fixed ring portion, a horizontal lever on the frame holding down the spring, a cam mounted within the frame, a spring in said cam and a wedge thereon so arranged that upon turning the cam the wedge will release the spring-lever, a cable secured with one end to the shoulder of the cam, a cylinder mounted on the rear of the handle with a cap on its front end wherein the other end of the cable is secured, a hollow piston-rod stationarily mounted having a piston on its rear end within said cylinder and a small opening with a valve in its rear end so that upon drawing out the cylinder the cam is actuated and its return retarded by partially-compressed air.

4. An automatic egg-boiler comprising a cooking vessel, with handle, a frame attached to the front end of said handle, a rod movably attached in said frame and extending down nearly to the bottom of the cooking vessel, an egg-container permanently fixed to the bottom portion of said rod and a spring with a fixed ring provided on its upper portion, a horizontal lever on the frame holding down the spring, a cam mounted within the frame, a spring in said cam and a wedge thereon so arranged that upon turning the cam the wedge will release the spring-lever, a cable secured with one end to the shoulder of the cam, a cylinder mounted on a movable support on the rear portion of the handle, a cap on the front end of said cylinder wherein the other end of the cable is secured, a hollow piston-rod stationarily mounted having a piston on its rear end within said cylinder, a small hole with a valve in its rear end so that upon drawing out the cylinder the cam is actuated and its return retarded by partially-compressed air, a scale representing minutes on the rear portion of the handle having indentations between the numbers wherein the movable support locates, and adjusting thereby the distance for which the cylinder may be drawn out.

5. An automatic egg-boiler comprising a cooking vessel with handle, a frame attached to the front end of said handle, a rod movably attached in said frame and extending down nearly to the bottom of the cooking vessel, an egg-container permanently fixed to the bottom portion of said rod and a spring with a fixed ring provided on its upper portion, a horizontal lever on the frame holding down the spring, a cam mounted within the frame, a spring in said cam and a wedge thereon so arranged that upon turning the cam the wedge will release the spring-lever, a cable secured with one end to the shoulder of the cam, a cylinder mounted on a movable support on the rear portion of the handle, a cap on the front end of said cylinder wherein the other end of the cable is secured, a hollow piston-rod stationarily mounted having a piston on its rear end within said cylinder, a small hole with a valve in its rear end so that upon drawing out the cylinder the cam is actuated and its return retarded by partially-compressed air, a scale representing minutes on the rear portion of the handle having indentations between the numbers wherein the movable support locates, and an adjustable air-escape valve permanently secured to the hollow piston-rod.

6. An automatic egg-boiler comprising a cooking vessel with handle, a frame attached to the front end of said handle, a rod movably attached in said frame and extending down nearly to the bottom of the cooking vessel, an egg-container permanently fixed to the bottom portion of said rod and a spring with a fixed ring provided on its upper portion, a horizontal lever on the frame holding down the spring, a cam mounted within the frame, a spring in said cam and a wedge thereon so arranged that upon turning the cam the wedge will release the spring-lever, a cable secured with one end to the shoulder of the cam, a cylinder mounted on roller-bearings in a movable support on the rear portion of the handle, a cap on the front end of said cylinder wherein the other end of the cable is secured, a hollow piston-rod stationarily mounted having a piston on its rear end within said cylinder, a small hole with a valve in its rear end so that upon drawing out the cylinder the cam is actuated and its return retarded by partially-compressed air, a scale representing minutes on the rear portion of the handle having indentations between the numbers wherein the movable support locates, an adjustable air-escape valve, a channel below same connecting it with the hollow piston-rod, and a spring-valve at the other end of said channel provided with a lever which is actuated by the shoulder of the same.

Signed at New York, N. Y., this 11th day of February, 1905.

FREDERICK F. ANDERSON.

Witnesses:
 JAMES J. ASTARITA,
 AGNES SIMMONS.